Figure 1:
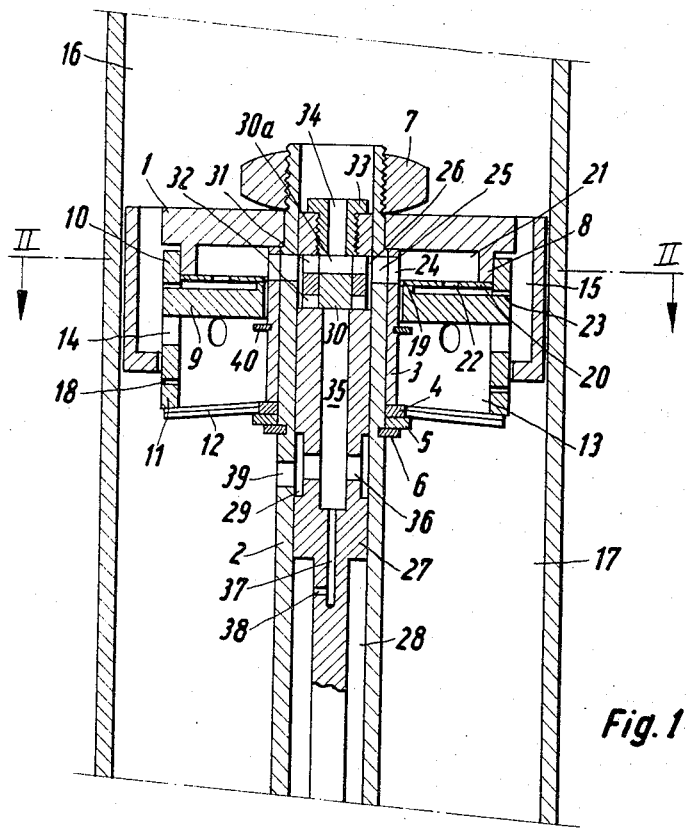

Jan. 23, 1968     J. H. WILLICH     3,365,033
STEPLESS OR CONTINUOUSLY ADJUSTABLE SHOCK ABSORBER
Filed Oct. 31, 1966

United States Patent Office 3,365,033
Patented Jan. 23, 1968

3,365,033
STEPLESS OR CONTINUOUSLY ADJUSTABLE
SHOCK ABSORBER
Jean Herbert Willich, Ennepetal-Altenvoerde, Germany,
assignor to August Bilstein, Ennepetal-Altenvoerde,
Westphalia, Germany, a corporation of Germany
Filed Oct. 31, 1966, Ser. No. 591,009
Claims priority, application Germany, Oct. 29, 1965,
B 84,311
8 Claims. (Cl. 188—88)

My invention relates to stepless or continuously adjustable shock absorbers, especially for motor vehicles, and more particularly to shock absorbers of this type having a cylinder filled with shock-absorbing or damping liquid, a working piston displaceably located therein, and a piston rod of hollow construction carrying the piston and provided with an adjustable rod in the interior thereof, which permits stepless or continuous adjustment of the effective passage cross section of the piston rod bore which connects the operating chamber spaces located on both sides of the operating piston to one another, a plurality of annular spring valve plates being provided for the operating piston which is formed with liquid flow-through channels.

Stepless or continuously adjustable shock absorbers of the aforementioned type are known wherein the operating piston is provided with two different groups of axially extending liquid flow-through channels for both flow directions of the shock absorber fluid, that is, for the compression and expansion stages of the shock absorber. The outlet ends of the channels in each of the groups of channels are covered by a plurality of annular spring valve plates securely fastened at their inner periphery to the piston. By suitably adjusting the adjustable rod mounted in the hollow piston rod, the damping characteristic of the shock absorber can be continually varied due to the thereby steplessly variable cross section of the piston rod bore. With the aforementioned known shock absorbers, in order to keep the ratio of forces or of damping from the hard to the soft adjustment condition the same for both operating directions of the piston, both in the expansion stage as well as in the compression stage of the shock absorber, in spite of the stepless adjustability, the spring valve plates located on one or both sides of the operating piston are respectively supported and resiliently retained on a supporting piston which is displaceable on the piston rod, the supporting piston having a hollow space which is in liquid-conductive connection on one side with the piston rod bore and on the other side with the operating chamber spaces. In this manner, it is possible to suitably relieve the spring valve plates of their respective applied loads so that with suitable dimensioning of the components a good stepless adjustment of the shock absorber and therewith a trouble-free accommodation to the desired constant damping ratio is possible.

It is accordingly an object of my invention to provide a shock absorber which is of stepless adjustability in both operating directions of the shock absorber operating piston that has a simple construction and whose damping ratio from soft to hard adjustment condition can be adjusted even more simply and more delicately or accurately than the heretofore known shock absorbers of this general type.

With the foregoing and other objects in view, I provide in accordance with my invention an adjustable shock absorber comprising a cylinder having an operating chamber containing shock absorber damping fluid, an operating piston displaceably located therein, a piston rod of hollow construction carrying the operating piston, an adjusting rod located in the hollow piston rod, the adjusting rod being adapted to steplessly adjust the effective flow-through cross section of the piston rod bore connecting together the operating chamber spaces located on both sides of the operating piston, the operating piston being formed with a plurality of liquid flow-through channels and provided with respective annular spring valve plates. The annular spring valve plates which are operable in both flow directions of the shock absorber liquid, are supported at their radially inner edge on the hollow piston rod and abut at their radially outer edge on an adjusting piston axially displaceable against a spring located adjacent to the operating piston. The adjusting piston defines an annular space with the operating piston which is liquid-conductively connected at all times by throttling bores with the liquid flow-through channels of the operating piston and by the steplessly adjustable piston rod bore, depending upon the flow direction of the shock absorber liquid, with the one or the other operating chamber space.

In accordance with a specific feature of the invention, the shock absorber is provided with only one packet of valve spring plates operative for both operating directions of the operating piston, so that it is very simple to produce and to assemble.

In accordance with further features of my invention, the valve spring packet is supported on an axially displaceable piston against the bias of a spring, and the annular space defined by the axially displaceable piston and the operating piston is connected on the one side through throttling bores and on the other side through the piston rod bore with the respective operating chamber spaces. By suitably dimensioning the individual components, it is consequently possible to maintain the damping intensity for both the expansion and compression stages, which is produced by the dynamic pressure arising in the annular space, either at the same value or at a specific desired ratio.

Although shock absorbers with annular spring valve plates are known and it is no longer new to adjustably bias annular spring valve plates for both operating directions of the operating piston in order to achieve a specific characteristic curve for the shock absorber, the adjustment is effected in the known devices by means of an adjusting nut surrounding the piston rod which is suitably screwed into the piston. This adjustment can be effected, however, only after the shock absorber is disassembled. Furthermore, in this heretofore known shock absorber, one cannot adjust the expansion and compression stages to various damping ratios.

A particularly advantageous embodiment of the shock absorber of my invention is produced by providing, in accordance with a further feature thereof, a two-way valve, located at the level of the annular space within the hollow piston rod, which is automatically reversible in dependence upon the flow direction of the shock absorber liquid. The two-way valve suitably comprises an axially displaceable free piston located within the adjusting rod and movable through the piston rod in a direction parallel to the axis thereof. Both faces of the free piston are connected with both operating chamber spaces respectively by longitudinal bores located in the adjusting rod and, on the piston rod side, by transverse bores formed in the adjusting rod and in the piston rod. The automatic reversal of the two-way valve piston is effected by the respectively reversing effective pressure of the shock absorber liquid. Thus, no influence can possibly be exerted thereon from the outside.

Other features which are considered as characteristic for the invention are set forth in the appended claims.

Although the invention is illustrated and described herein as embodied in stepless adjustable shock absorber, especially for motor vehicles, it is nevertheless not intended to be limited to the details shown, since various modifications and structural changes may be made therein without departing from the spirit of the invention and within the scope and range of equivalents of the claims.

Figure 2:
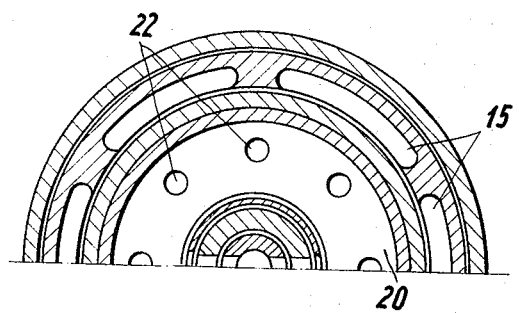

The construction and method of operation of the invention, howver, together with additional objects and advantages thereof will be best understood from the following description of specific embodiments when read in connection with the accompanying drawings, in which FIG. 1 is a longitudinal section of a shock absorber constructed in accordance with my invention; and FIG. 2 is a partial cross section taken along the line I—I in FIG. 1 in the direction of the arrows.

Referring now to the drawings, there is shown an operating piston 1 seated on a hollow piston rod 2 and supported on a sleeve 3 surrounding the piston rod 2. Also supporting the hollow piston rod 2 are centering disc 4 and a supporting disc 5 which is in turn held by a snap ring 6. A nut 7 is tightly screwed to the piston rod 2 so as to firmly bind the piston 1, sleeve 3, and discs 4 and 5 against the snap ring 6. The operating piston 1 is provided with an annular flange 8 over which an edge 10 of an adjusting piston 9 is seal-tightly fitted. The adjusting piston 9 is mounted for axial displacement on the sleeve 3 and is provided with a piston skirt 11 which seal-tightly slides in the operating piston 1. The end surface of the piston skirt 11 forms the outer abutment surface for the damping annular spring valve disc 12 which is supported at its inner edge on the supporting disc 5 and held in position by the centering disc 4. The annular spring discs 12 close off the annular space 13 in the adjusting piston 9. Radial openings 14 in the adjusting piston 9 and axially extending flow-through channels 15 in the working piston 1 provide free communication between the operating chamber space 16 and the annular space 13. The ever-present intercommunication, which also determines the damping adjustment, is provided by the throttling bores 18 connecting the operating chamber space 16 by the flow-through channels 15, the openings 14 and the annular space 13 with the operating space 17 on the piston rod side. On the side of the adjusting piston 9 located opposite the annular spring disc valve, an annular projection 19 of the adjusting piston 9 abuts an annular spring disc 20 which in turn abuts the annular flange 8 of the operating piston 1 so that the adjusting piston 9 is held tightly between the spring discs 12 and 20. The annular spring disc 20 preferably has a greater stiffness than the spring disc packet 12.

The adjusting piston 9 defines with the operating piston 1 an annular space 21 which is connected on the one side by cut-outs 22 in the annular spring disc 20 and the throttling bores 23 in the adjustable piston 9 with the flow-through channels 15, and on the other side by bores 24 in the sleeve 3 and bores 25 in the piston rod 2 with an annular recess 26 in the adjusting rod 27. The adjusting rod 27 is mounted in the bore 28 of the hollow piston rod 2 and is provided with a further annular recess 29 similar to the annular recess 26. At the level of the annular recess 26, there is located a two-way valve which, in the expansion stage of the shock absorber, i.e. when the piston rod is driven outwardly from the cylinder connects the operating chamber space 17 with the annular space 21 and simultaneously closes off its connection with the operating chamber 16 which does not contain the piston rod. However, in the compression stage of the shock absorber, i.e. when the piston rod is driven into the cylinder, the exact opposite operation takes place. The two-way valve comprises the valve piston 30 slidable in the bore 30a of the adjusting rod 27, the connecting bores 31 and 32, the axial bore 34 of the locking screw 33, and the adjusting rod bore 35 with the transverse bores 36. For the purpose of volume equalization, the adjusting rod 27 is additionally provided with a longitudinal bore 37 and a transverse bore 38. The transverse bore 39 in the piston rod 2 connects the operating chamber space 17 with the adjusting rod bore 35. For each position of the adjusting rod 27, the last-mentioned connection is maintained by the annular recess 29, while the bores 25 can be steplessly or continuously opened or closed by the adjusting rod 27.

FIG. 1 shows the position of the adjusting rod 27 for extremely hard damping adjustment, and the position of the valve piston 30 for the compression stage, i.e. when the piston rod is being driven into the cylinder. In this phase of operation, the damping medium flows out of the operating chamber space 16 through the flow-through channels 15 and the radial openings 14 into the annular space 13 from there between the outer edge of the raised spring disc valves 12 and the end surface of the piston skirt 11 into the operating chamber space 17, a small portion of the liquid flowing through the bores 18. Simultaneously, the damping medium flows from the operating chamber space 16 through the longitudinal bore 34 into the valve bores 30a, while the bore 35 is closed by the valve piston 30. From the bore 30a, the damping medium flows through the bores 31, 25 and 24 into the annular space 21 where a dynamic or back pressure is produced, the amount of which is determined by the resistance of the in-flow and the essentially greater resistance of the small-diameter outflow bore 23. In the indicated position of the adjusting rod 27, the back pressure in the annular space 21 nearly reaches the existing pressure in the operating chamber space 16, whereas the pressure in the flow-through channels 15 is lower than in the operating chamber space 16 because of the flow present in those channels. Due to the back pressure in the annular space 21, the adjusting piston 9 is thrust with an additional force reinforcing the bias of the annular spring disc 20 against the spring disc 12 whereby a higher flow resistance is produced at the spring disc 12 and therewith a harder damping effect is produced. If the bores 25 are partly closed by shifting the adjusting rod 27 in a downward direction as viewed in FIG. 1, the flow resistance is increased with the inflow of the damping medium into the annular space 21 and the back pressure consequently falls off, thereby effecting a softer damping adjustment. The softest adjustment is obtained when the inflow of medium to the annular space 21 is completely closed off by the adjusting rod 27. With the reverse motion of the operating piston 1 from the compression stage to the expansion stage, the valve piston 30 is shifted to the other side by the pressure in the operating chamber space 17, which is connected with the valve piston 30 by the piston transverse bore 39, the annular recess 29 and the bores 36 and 35, so that the damping medium can further flow through the bores 32, the annular recess 26 and the bores 25 and 24 into the annular space 21. The same above-described reenforcing effect is produced in the compression stage. By suitable dimensioning of the various inflow bores, the degree of damping reenforcement for both the expansion and compression stages can be maintained equal or can be held at a specific ratio. The ratio of the damping reenforcement can, however, also be easily varied by providing at one of the sealing surfaces of the adjusting piston 30 a leak hole which reduces the back pressure in the annular chamber 21 and simultaneously adds to the overall flow diameter through which the spaces 16 and 17 are continuously or at all times in intercommunication.

In the expansion stage, the spring discs 12 are raised at their inner diameter edge from the supporting disc 5, the biasing force thereof again determining the flow-through resistance or the damping force. According to the need, the reenforcement of the spring bias can be limited by the displacement of the adjusting piston 9 in a direction of the spring discs 12 by a stop 40 located on the sleeve 3, for example when a sharply reducing or degressive damping characteristic must be obtained.

I claim:

1. Continuously adjustable shock absorber, comprising a cylinder having an operating chamber containing damping fluid, an operating piston displaceably located in said cylinder and dividing said operating chamber into two spaces on respective opposite sides of said operating piston, said piston being formed with a plurality of flow-through channels, a piston rod of hollow construction carrying said operating piston, the hollow interior of said piston rod forming a fluid flow-through path between said operating chamber spaces, an adjusting rod located in said hollow piston rod, said adjusting rod being movable in said piston rod for steplessly adjusting the effective flow-through cross section of said flow-through path, spring means mounted on said piston rod and located adjacent said operating piston, an adjusting piston mounted on said piston rod and defining an annular space with said operating piston, said adjusting piston being axially displaceable into engagement with said spring means, annular spring plate valve means supported at their radially inner edge on said hollow piston rod and abutting at the radially outer edge thereof against said adjusting piston, said adjusting piston being formed with throttling bore means providing fluid-conductive communication between said annular space and said flow-through channels of said operating piston, whereby said annular space is fluid-conductively connected at all times with the one or the other operating chamber spaces by said throttling bore means and said fluid flow-through channels of said operating piston on the one hand and by said steplessly adjustable flow-through path in the hollow interior of said piston rod on the other hand, depending upon the direction of flow of said damping fluid.

2. Shock absorber according to claim 1, including a two-way valve located within the hollow interior of said piston rod at the level of said annular space, said two-way valve being automatically reversible in dependence upon the flow direction of said damping fluid.

3. Shock absorber according to claim 2, wherein said two-way valve comprises an axially displaceable free piston located in said adjusting rod and movable in a direction parallel to the axis of said piston rod, said adjusting rod being formed with longitudinally extending bores, and both said adjusting rod and said piston rod being formed with transverse bores, said longitudinal and transverse bores providing a flow path connecting the end faces of said free piston with both said operating chamber spaces.

4. Shock absorber according to claim 3, wherein said adjusting piston is formed with a first annular recess, and said adjusting rod and said piston rod have transverse bores communicating with one another through said first annular recess, and, at the level of said free piston, said adjusting piston is formed with another annular recess providing communication between transverse bores in said adjusting rod and said piston rod located at said level.

5. Shock absorber according to claim 1, wherein said adjusting piston and said operating piston are hollow, the outside of said adjusting piston being displaceably guided in said operating piston, and the inside of said adjusting piston being displaceably guided on a sleeve surrounding said piston rod and located between said operating piston, and centering and supporting means also located on said piston rod and serving for supporting said annular spring plate valve means.

6. Shock absorber according to claim 1, wherein an annular space is defined by said annular spring plate means and said adjusting piston, said operating piston is formed with a plurality of lateral axially extending fluid flow-through channels, and said adjusting piston is formed with radial openings, said axial flow-through channels of said operating piston and said radial openings of said adjusting piston providing continuous communication between said annular space defined by said spring plate means and said adjusting piston with the operating chamber space located on the side of said piston rod, said adjusting piston being also provided with at least one throttle bore directly connecting said last-mentioned annular space with said last-mentioned operating chamber space.

7. Shock absorber according to claim 1, wherein said spring means located adjacent said operating piston is an annular disc spring formed with flow-through openings, said adjusting cylinder having an annular projection, and said operating piston being formed with an annular flange, said annular disc spring being located between said annular projection and said annular flange in abutting engagement therewith.

8. Shock absorber according to claim 1, including a sleeve member surrounding said piston rod, stop means located on said sleeve member for limiting axial displacement of said adjusting piston in the direction toward said spring means.

References Cited

UNITED STATES PATENTS

| | | | |
|---|---|---|---|
| 967,285 | 8/1910 | Wilson | 188—88 |
| 2,244,501 | 6/1941 | Pierce | 188—88 |

FERGUS S. MIDDLETON, *Primary Examiner.*

G. E. HALVOSA, *Assistant Examiner.*